United States Patent
Pearcy et al.

(10) Patent No.: US 10,038,708 B2
(45) Date of Patent: *Jul. 31, 2018

(54) GEO-MAPPING SYSTEM SECURITY EVENTS

(71) Applicant: McAfee, LLC, Santa Clara, CA (US)

(72) Inventors: Derek Patton Pearcy, San Francisco, CA (US); Jessica Anne Heinrich, Tacoma, WA (US); Jessica Jeanne Gaskins, Boulder Creek, CA (US)

(73) Assignee: McAfee, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,010

(22) Filed: May 28, 2016

(65) Prior Publication Data

US 2017/0091972 A1    Mar. 30, 2017

Related U.S. Application Data

(63) Continuation of application No. 14/635,033, filed on Mar. 2, 2015, now Pat. No. 9,356,970, which is a
(Continued)

(51) Int. Cl.
*G06F 11/00* (2006.01)
*G06F 12/14* (2006.01)
(Continued)

(52) U.S. Cl.
CPC .... *H04L 63/1416* (2013.01); *G06F 17/30241* (2013.01); *G06T 11/60* (2013.01); *H04L 41/06* (2013.01); *H04L 41/22* (2013.01)

(58) Field of Classification Search
CPC ..... H04L 63/1416; H04L 63/00; G06F 21/56; G06F 21/60; G06F 21/00; H04W 12/06; H04W 12/07; H04W 12/08; H04W 12/12
(Continued)

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| CN | 102158355 A | 8/2011 |
| KR | 10-0992066 B1 | 11/2010 |

(Continued)

OTHER PUBLICATIONS

Information Technology Risk Management, Copyright 2002, © Glen B. Alleman, Niwor, Colorado, 22 pages.
(Continued)

*Primary Examiner* — Dant B Shaifer Harriman
(74) *Attorney, Agent, or Firm* — Patent Capital Group

(57) ABSTRACT

A particular security event is identified that has been detected as targeting a particular computing device included in a particular computing system. A particular grouping of assets in a plurality of asset groupings within the particular computing system is identified as including the particular computing device. A source of the particular security event is also identified and at least one of a geographic location and a grouping of assets in the plurality of asset groupings is associated with the identified source. Data is generated that is adapted to cause a presentation of a graphical representation of the particular security event on a display device, the graphical representation including a first graphical element representing the particular computing device as included in the particular grouping of assets and a second graphical element representing the source associated with the at least one of a geographic location and a grouping of assets.

20 Claims, 11 Drawing Sheets

Related U.S. Application Data continuation of application No. 13/340,657, filed on Dec. 29, 2011, now Pat. No. 8,973,147.

(51) Int. Cl.

| | |
|---|---|
| *G06F 12/16* | (2006.01) |
| *G08B 23/00* | (2006.01) |
| *H04L 29/06* | (2006.01) |
| *G06T 11/60* | (2006.01) |
| *G06F 17/30* | (2006.01) |
| *H04L 12/24* | (2006.01) |

(58) Field of Classification Search
USPC .......................................................... 726/23
See application file for complete search history.

(56) References Cited

U.S. PATENT DOCUMENTS

| | | | |
|---|---|---|---|
| 6,460,050 B1 | 10/2002 | Pace et al. | |
| 6,664,985 B1 | 12/2003 | Bormann et al. | |
| 6,906,709 B1 | 6/2005 | Larkin et al. | |
| 7,139,819 B1 | 11/2006 | Luo et al. | |
| 7,246,370 B2 | 7/2007 | Valente et al. | |
| 7,451,488 B2 | 11/2008 | Cooper et al. | |
| 7,506,155 B1 | 3/2009 | Stewart et al. | |
| 7,546,637 B1 * | 6/2009 | Agbabian ............... | H04L 63/20 709/223 |
| 7,814,543 B2 * | 10/2010 | Phillips ................. | G06F 21/567 713/100 |
| 8,074,256 B2 | 12/2011 | Valente et al. | |
| 8,418,246 B2 * | 4/2013 | McConnell ............ | G06F 21/55 726/22 |
| 8,973,147 B2 | 3/2015 | Pearcy et al. | |
| 9,356,970 B2 | 5/2016 | Pearcy et al. | |
| 2008/0109870 A1 | 5/2008 | Sherlock et al. | |
| 2009/0119414 A1 | 5/2009 | Estrada et al. | |
| 2010/0030892 A1 * | 2/2010 | Jeong .................. | H04L 63/1416 709/224 |
| 2010/0067390 A1 | 3/2010 | Pereira Valente et al. | |
| 2010/0162392 A1 | 6/2010 | Jeong et al. | |
| 2010/0257576 A1 | 10/2010 | Valente et al. | |
| 2011/0225622 A1 | 9/2011 | Pearcy et al. | |
| 2013/0174259 A1 | 7/2013 | Pearcy et al. | |
| 2015/0172323 A1 | 6/2015 | Pearcy et al. | |

FOREIGN PATENT DOCUMENTS

| | | |
|---|---|---|
| WO | WO 2009-038248 A1 | 3/2009 |
| WO | WO 2013/101372 A1 | 7/2013 |

OTHER PUBLICATIONS

International Search Report and Written Opinion, International Application No. PCT/US2012/066561, dated Feb. 15, 2013, 10 pages.
USPTO May 22, 2013 Nonfinal Office Action from U.S. Appl. No. 13/340,657.
USPTO Oct. 25, 2013 Final Rejection from U.S. Appl. No. 13/340,657.
USPTO Feb. 28, 2014 Nonfinal Rejection from U.S. Appl. No. 13/340,657.
USPTO Jun. 26, 2014 Final Rejection from U.S. Appl. No. 13/340,657, 25 pages.
International Preliminary Report on Patentability in International Application No. PCT/US2012/066561, dated Jul. 1, 2014, 6 pages.
USPTO Oct. 20, 2014 Notice of Allowance from U.S. Appl. No. 13/340,657, 25 pages.
Supplementary European Search Report in EP Application No. EP 12 86 1466, dated Jul. 27, 2015, 9 pages.
"Epicenter Concepts and Solutions Guide, Version 6.0," Internet Citation, Nov. 1, 2006 (Nov. 1, 2006), pp. 9-267, Retrieved from the Internet: URL:http://www.extremenetworks.com/libraries/services/EPICenter60_SolutionsGuide.pdf.
USPTO Sep. 25, 2015 Notice of Allowance from U.S. Appl. No. 14/635,033, 14 pages.
USPTO Feb. 1, 2016 Notice of Allowance from U.S. Appl. No. 14/635,033, 9 pages.
Office Action in CN Application No. 201280064886.5, dated Dec. 28, 2015, with English translation, 34 pages.
Gong, Jian-wei, et al., "MapXtreme, Multilevel Map of Network Security Situation Based on MapXtreme," Computer Knowledge and Technology, Oct. 2011, English language Abstract, 4 pages.
Office Action in in CN Application No. 201280064886.5, dated Aug. 30, 2016, with English translation, 25 pages.
Office Action in in CN Application No. 201280064886.5, dated Dec. 8, 2016, English translation, 16 pages.

\* cited by examiner

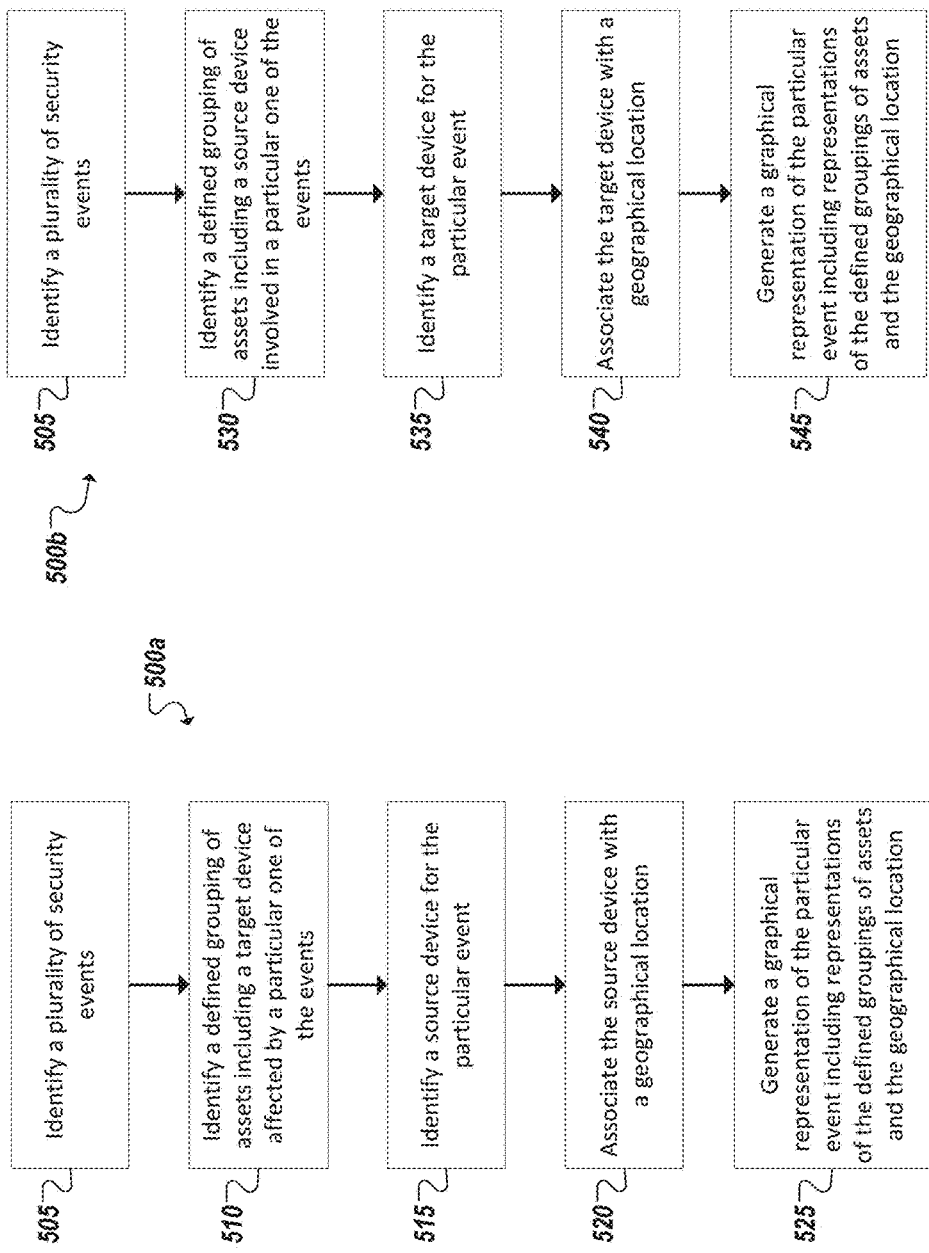

GEO-MAPPING SYSTEM SECURITY EVENTS

RELATED APPLICATION

This Application is a continuation (and claims the benefit of priority under 35 U.S.C. § 120) of U.S. application Ser. No. 14/635,033, filed Mar. 2, 2015, entitled "GEO-MAPPING SYSTEM SECURITY EVENTS," Inventors Derek Patton Pearcy et al., which is a continuation (and claims the benefit of priority under 35 U.S.C. § 120) of U.S. application Ser. No. 13/340,657, filed Dec. 29, 2011, now issued as U.S. Pat. No. 8,973,147, entitled "GEO-MAPPING SYSTEM SECURITY EVENTS," Inventors Derek Patton Pearcy et al. The disclosures of both of the prior applications are considered part of (and are incorporated by reference in) the disclosure of this application.

TECHNICAL FIELD

This disclosure relates in general to the field of data analytics and, more particularly, to graphical user interfaces in data analytics software.

BACKGROUND

Computer security tools have been deployed throughout the world to assist in protecting computing systems, devices, and resources from various threats, vulnerabilities, and risks. The evolution of malware, viruses, worms, system vulnerabilities, hacks, and threats originating from a continually-growing and internationalized universe of sources continues to keep pace with the advances in computing. Accordingly, demand for robust and sophisticated security tools to counteract such threats has also increased. Given the increasing complexity of such tools and the increasing degree to which administrators can customize their security tools to deal with specific threats, including threats unique to particular devices, systems, and applications, managing and understanding the functionality of some security tools has become too complex for all but the most sophisticated of users. One such example of a security tool that has become notoriously complex to manage is modern network firewalls. A firewall can be a device or set of devices designed to permit or deny data transmission both in and out of a system, including transmissions over a network transmissions. A firewall's operation can be based upon a set of rules or policies and can be used, for instance, to protect networks and systems from unauthorized access by nefarious users and programs, while still permitting legitimate communications. In some instances, operating systems can also include software-based firewalls to protect a corresponding system or host from various threats, such as threats commonly found and delivered via the Internet.

BRIEF DESCRIPTION OF THE DRAWINGS

FIGS. 5A-5B are simplified flowcharts illustrating example operations associated with at least some embodiments.

Like reference numbers and designations in the various drawings indicate like elements.

DETAILED DESCRIPTION OF EXAMPLE EMBODIMENTS

Overview

Figure 1:
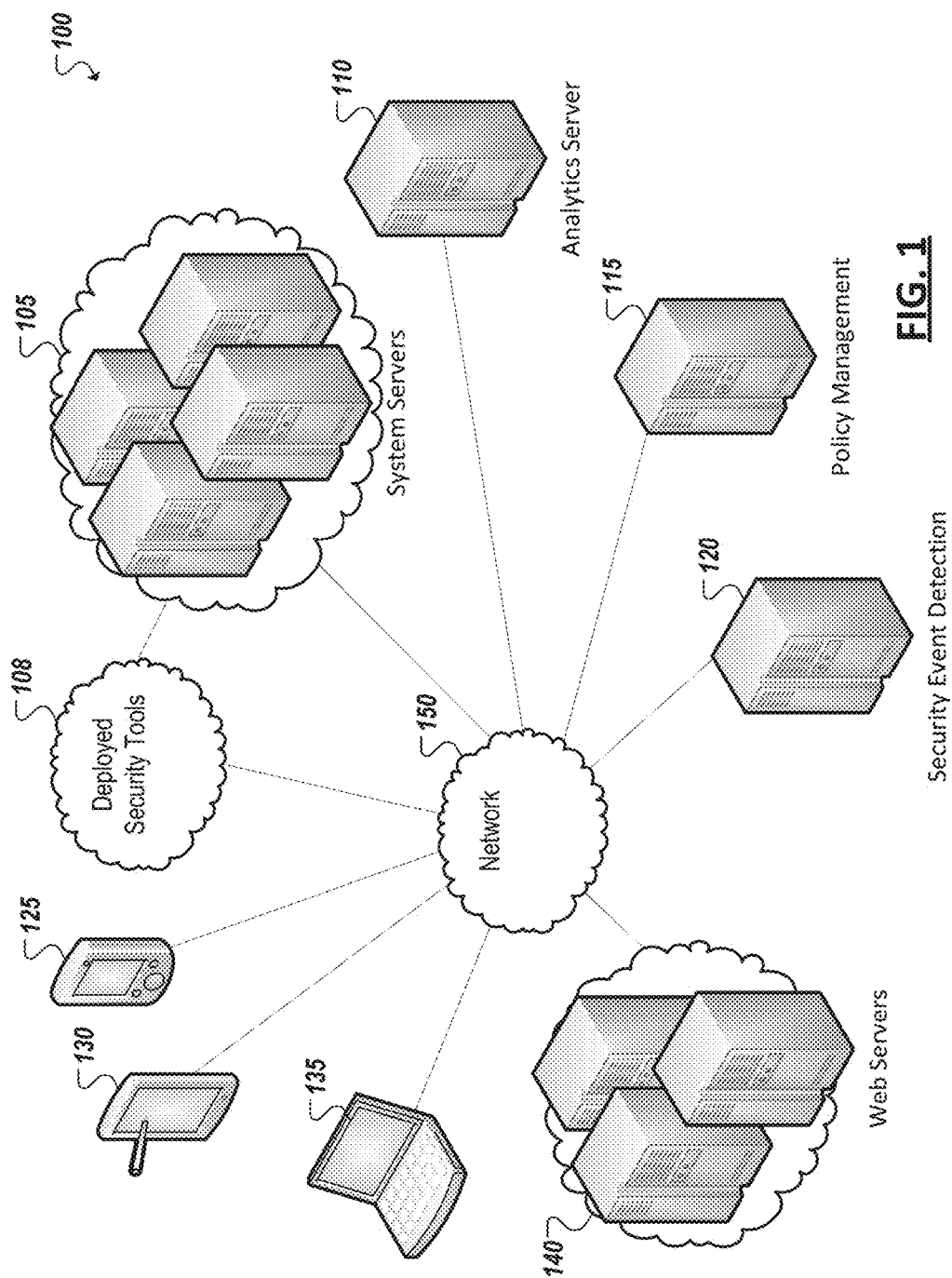
FIG. 1 is a simplified schematic diagram of an example computing system including security event management and geo-mapping functionality in accordance with at least some embodiments.

In general, one aspect of the subject matter described in this specification can be embodied in methods that include the actions of identifying a particular security event detected in a particular computing system, the particular security event detected as targeting a particular computing device included in the particular computing system. A particular grouping of assets in a plurality of asset groupings defined for devices within the particular computing system can be identified as including the particular computing device. A source of the particular security event can be identified associated with at least one second computing device and at least one of a geographic location and a grouping of assets included in the plurality of asset groupings can be associated with the source of the particular security event. Data can be generated that is adapted to cause or render a presentation of a graphical representation of the particular security event on a display device, the graphical representation including: a first graphical element representing the particular computing device as included in the particular grouping of assets and a second graphical element representing the source associated with the at least one of a geographic location and a grouping of assets included in the plurality of asset groupings.

Further, in another general aspect, a system can be provided including at least one processor device, at least one memory element, and a geo-mapping engine. The geo-mapping engine, when executed by the processor, can identify a particular security event detected in a particular computing system (the particular security event detected as targeting a particular computing device included in the particular computing system), identify a particular grouping of assets in a plurality of asset groupings defined for devices within the particular computing system as including the particular computing device, identify a source of the particular security event, associate the source with at least one of a geographic location and a grouping of assets included in the plurality of asset groupings, and generate data adapted to cause a graphical representation of the particular security event to be presented on a display device. The graphical representation can include a first graphical element representing the particular computing device as included in the particular grouping of assets and a second graphical element representing the source associated with the at least one of a geographic location and a grouping of assets included in the plurality of asset groupings.

Further, in another aspect of the subject matter described in this specification can be embodied in methods that include the actions of identifying a particular security event detected in a particular computing system, the particular security event detected as involving a particular computing device included in the particular computing system and targeting at least one second computing device outside the computing system. A particular grouping of assets in a plurality of asset groupings defined for devices within the particular computing system can be identified as including the particular computing device. The second computing device can be associated with a geographic location. Additionally, data can be generated that is adapted to cause or render a presentation of a graphical representation of the particular security event on a display device, the graphical representation including: a first graphical element representing the particular computing device as a source of the particular security event and included in the particular grouping of assets, and a second graphical element representing the second computing device associated with the geographic location and overlaid on a portion of a representation of a geographical map corresponding to the geographic location.

These and other embodiments can each optionally include one or more of the following features. The graphical representation can include a view of a geographic map and at least one of the first and second graphical elements can be overlaid on the view of the geographic map. The source can be associated with a particular geographic location included in the view of the geographic map and the particular geographic location can be identified from a device identifier associated with the source. The graphical representation can further include a representation of two or more asset groupings in the plurality of asset groupings, the two or more asset groupings including the particular grouping. The first graphical element can be positioned in the graphical representation to correspond with the representation of the particular grouping and the second graphical element can be positioned in the graphical representation to correspond with the particular geographic location on the view of the geographic map. The graphical representation can further include a graphical connector associating the first graphical element with the second graphical element and representing that the particular computing device and the source are associated with the particular security event. The first graphical element can be a bubble element and a diameter of the bubble element corresponds to a quantity of detected security events including the particular security event. The graphical representation can further include representations of each of the plurality of security events. The first graphic element can include a first type of graphic element representing targets of a security event and the second graphic element can be a second, different type of security event representing sources of a security event.

Further, embodiments can each optionally include one or more of the following features. The source can be identified as included in the particular computing system and the source can be associated with a first grouping in the plurality of asset groupings. The particular grouping can be the first grouping or a grouping other than the first grouping. In some instances, asset groupings can be distinct, user-defined asset groupings, while in other instances, asset groupings can correspond to a range of IP addresses of assets in the particular computing system. The graphical representation can be an interactive presentation and user interactions with one or more of the first and second graphical elements can cause a view to be presented of details of the particular security event. User interaction can include such actions as a mouse-over of one or more of the first and second graphical elements, selection of one or more of the first and second graphical elements, and other actions. The graphical representation of the particular security event can further communicate a type of the particular security event. For instance, the graphical representation can color-code each of the first and second graphical elements according to the type of the particular security event, the type of the particular security event being one of a plurality of security event types, each of the plurality of security event types coded to a respective color.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a system of computing devices (e.g., 105, 125, 130, 135) monitored by one or more security tools 108. Some of these security tools 108 can be resident on system servers 105, networks, network interfaces, and devices 125, 130, 135, while other security tools 108 can be provided as services, for instance, using computing devices and infrastructure remote from the system servers 105 monitored by the tools. System 100 can further include an analytics server 110, policy management server 115, and security event detection server 120 provided in connection with one or more security tools 108 monitoring system servers 105. User endpoint devices (e.g., 125, 130, 135) can also be provided in system 100. In some instances, one or more endpoint devices (e.g., 125, 130, 135) can interact with and consume services and resources hosted by system servers 105 as well as other servers and devices (e.g., web servers 140) over one or more networks 150. In some instances, one or more endpoint devices (e.g., 125, 130, 135), as well as one or more of analytics server 110, policy management server 115, and security event detection server 120, can be considered included within a system of computing devices including system servers 105, such as an enterprise software system. Further, some security tools implemented in the system can be deployed on or otherwise monitor endpoint devices 125, 130, 135 and computing devices implementing one or more of analytics server 110, policy management server 115, and security event detection server 120.

Security tools 108 used to monitor a system, as well as the system's interactions with outside systems and devices (e.g., web servers 140), can collect various data relating to the security tools' operation and the events, transactions, and system devices and components monitored by the security tools. Security tools 108 can include software- and/or hardware-based tools including firewalls (FWs), web gateways, mail gateways, client-based user risk assessment engines, host intrusion protection (HIP) tools, network intrusion protection (NIP) tools, anti-virus and anti-malware scanners and removal tools, host-based and/or network-based data loss prevention (DLP) tools, vulnerability managers, system policy compliance managers, asset criticality tools, security information management (SIM) products, among other security tools. Security tools 108 can be deployed on one or more endpoint devices (e.g., 125, 130, 135), network elements (e.g., of network 150), system servers 105, or other components of a particular system. One or more of the deployed security tools 108 can operate and protect system components according to a corresponding set of rules or policies dictating, for instance, conditions for intervention, filtering, blocking, monitoring, event or alert detection, traffic shaping, or other security tasks performed by security tools 108. Additionally, security tools 108 can detect particular events relating to the security of the system and the operations of the respective security tools 108, such as detected threats, network use violations, detected vulnerabilities, system use violations, system errors, unauthorized access attempts, and other events and can collect, store, and report data collected in connection with the monitoring and detection of events. Events detected using security tools 108 can themselves be based, at least in part, on rules and policies of security tools 108 and the monitored system.

Security data relating to actions and policies of deployed security tools 108, as well as data relating to the monitoring and detection of security events, can be collected and maintained by particular security tools substantially independent of other data collected or maintained by other security tools and system components. Security data can be identified, categorized, and aggregated by one or more system components, including a policy manager server 115 adapted, for instance, to collect, receive, and otherwise aggregate security data relating to various security policies and rules employed by one or more security tools. Additionally, a security event detection server 120 can, in some implementations, similarly collect and aggregate data describing attributes of events and conditions within the monitored systems and components as detected by various security tools 108.

An analytics server 110 can be provided to assist users in analyzing and processing data collected from system security tools 108, such as through policy management server 115 and security event detection server 120. Analytics server 110 can include data analytics software allowing users to view, sort, filter, organize, perform analytics calculations and operations, as well as other tasks on security data, including security data organized by policy management server 115, security event detection server 120, or other tools in system 100. In some implementations, analytics server 110, or another device or subsystem, can further provide functionality for analyzing detected security events based on geographic locations associated with the events. Data collected by security tools 108 can identify or be used (e.g., by analytics server 110) to identify particular computing devices (e.g., by IP or MAC address, or some other identifier) involved in a security event. A security event can include a "source" of the event, or devices (or users associated with the devices) whose activity has been determined to be a likely cause of the security event. A security event can also include a "target" of the event, or devices, networks, or subsystems that are targeted or affected by the event, or are involved in the detection of the event. A source or target can be a device, network, or subsystem within the monitored system (e.g., devices 105, 125, 130, 135), or can be a device, network, or system outside or remote from the monitored system (e.g., web servers 140, one or more end user devices (e.g., 125, 130, 135). In some instances, an attack or other security event on a particular device can be detected and interrupted, for instance, by countermeasures employed on the system 100, and while the targeted device may not have been actually affected by the security event, the targeted device may nonetheless be determined to have been a "target." The effects of other detected attacks or security events may not have been successfully prevented, with the affected devices still being considered targets.

In addition to identifying particular source and target devices involved in a particular, detected security event, an analytics server 110, or another device or subsystem, can determine a geographic location for the devices (e.g., from a geo-location database of IP addresses, third-party geo-location services, or using other geo-locational technology, including known and future geo-location techniques). Additionally, devices within a particular system or network (e.g., a corresponding enterprise software system) can be identified as belonging to one or more pre-defined groups, IP address ranges, or other groupings or subsystems. Further, analytics server 110 can be used in connection with the generation of graphical user interfaces (GUIs) including various views and representations of security data and allowing users of devices (e.g., 125, 130, 135) to perform analytics on security data generated and collected by security tools 108. Such GUIs and analytics presentations can include the generation of interactive geographical mappings of security events detected in a system, such as described and shown in several of the examples below.

In general, "servers," "clients," and "computing devices," including computing devices used to implement or otherwise included in system 100 (e.g., 105, 108, 110, 115, 120, 125, 130, 135, 140, etc.), can include electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers, clients, and computing devices (e.g., 105, 108, 110, 115, 120, 125, 130, 135, 140, etc.) can each include one or more processors, computer-readable memory, and one or more interfaces, among other features and hardware. Servers can include any suitable software component or module, or computing device(s) capable of hosting and/or serving a software application or services (e.g., services of analytics server 110), including distributed, enterprise, or cloud-based software applications, data, and services. For instance, servers can be configured to host, serve, or otherwise manage data sets, or applications interfacing, coordinating with, or dependent on or used by other services, including security-focused applications and software tools. In some instances, a server, system, subsystem, or computing device can be implemented as some combination of devices that can be hosted on a common computing system, server, server pool, or cloud computing environment and share computing resources, including shared memory, processors, and interfaces.

Endpoint computing devices (e.g., 125, 130, 135) can include laptop computers, tablet computers, smartphones, personal digital assistants, handheld video game consoles, desktop computers, internet-enabled televisions, and other devices capable of communicating with and operating in connection with other computing devices, including, analytics server 110 and/or system servers 105, web servers 140, or other remote devices and systems over one or more networks 150. Attributes of endpoint computing devices 125, 130, 135 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 125, 130, 135). Other device attributes can also include peripheral devices connected or otherwise accessible to the device, and the types of network technology for which the device is adapted.

Each endpoint computing device can include at least one graphical display device and user interfaces allowing a user to view and interact with graphical user interfaces of applications and other programs provided in system 100, for instance through analytics server 110. In general, endpoint computing devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Despite providing critical protection to computing systems and resources, modern security tools can be difficult to manage and accurately deploy. For large enterprises and system, firewalls, policy compliance, anti-malware, and other security tools deployed therein can be governed by a dizzying array of policies and rules crafted for the potentially limitless and diverse issues and uses of the enterprise's systems and security tools. Global enterprises can suffer the additional complexity of monitoring devices and subsystems in multiple and diverse geographic regions. Some security threats and issues can be more prominent for some geographic locations than others.

Assessing security events, developing responsive security and enterprise policies, and implementing security tools and countermeasures to guard the system against such threats and vulnerabilities can be a difficult task. To illustrate one example, a firewall deployed in an enterprise can be tasked with blocking "bad" traffic from passing (i.e., entering or exiting), while still allowing good (and important) traffic of the enterprise to flow freely, among other functions. Achieving this can involve defining thousands of granular rules and policies governing what traffic to allow or block, when to do so, who (i.e., which users) to allow or deny, under what conditions to allow or block traffic, among other considerations. For example, firewall rules can vary depending upon on the source or destination of particular traffic (e.g., whether the location of the server or client influences risk associated with the traffic, whether a role of a particular user (e.g., high-level executives, HR personnel, IT personnel) can allow certain trust or privileges not held by other users, etc.), among other examples.

Further, in some modern enterprise networks, addressing of host devices within the network has been carried-out inconsistently, with some enterprises assigning IP addresses arbitrarily as hosts are added to the network. Other inconsistencies exist as well, adding a degree of disorganization to management of modern enterprise systems. Generally, identifying and making sense of the significance of certain detected security events within a system can be difficult, particularly when the administrator lacks a convenient way of identifying what portion of the system (e.g., particular office, type of device, etc.) is affected or involved in the event. Effectively diagnosing and addressing the cause or vulnerability exploited by an event, quickly isolating affected assets and sub-networks, and launching appropriate countermeasures to address the detected events can be hindered by administrators' ability to visualize and understand events affecting the system, among other examples.

Managing this web of policies, events, and assets, as well as a similarly complicated web of security tools in a system can be a challenge, especially as inconsistencies arise in system security. Traditional security solutions, while attempting to provide users with granular control over security management, can often overwhelm all but the most sophisticated of users with the corresponding complexity of their own solutions, GUIs, and security management tools. A system for managing security within a system including integration of security events and policy, such as outlined in FIGS. 1 and 2, can resolve these issues, among others.

Figure 2:
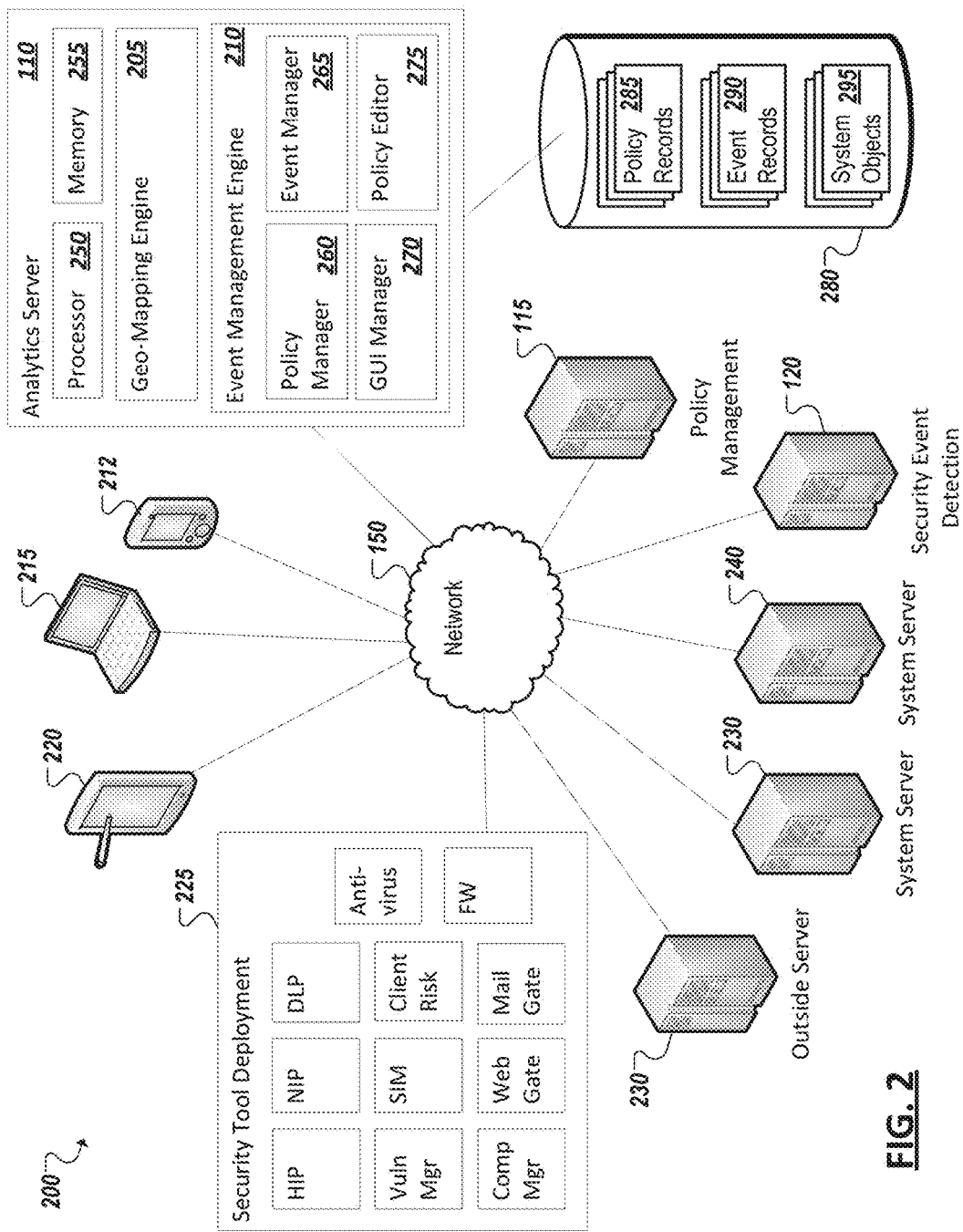
FIG. 2 is a simplified block diagram of an example system including an example geo-mapping engine in accordance with at least some embodiments.

Turning to FIG. 2, a simplified block diagram 200 is shown of an example system including an example analytics server 110 providing a geo-mapping engine 205 and n event management engine 210. Analytics server 110 can communicate with and provide data and services for use in developing and rendering GUIs on endpoint devices 212, 215, 220 utilized by users to analyze security conditions for a system (e.g., including one or more of endpoint devices 212, 215, 220, network 150, servers 230, 240, among other devices and system components). Such GUIs can include geographical mappings of detected security events, similar to those shown and discussed below (e.g., in connection with FIGS. 4A-4D). GUIs generated and provided by the analytics server 110 can further include interactive tables, graphs, infographics, and other graphical representations of security data collected by or relating to one or more security tools (e.g., 225) deployed on the system. Users can interact with the GUIs displayed on endpoint devices (e.g., 212, 215, 220) and perform analytics tasks, including filtering, examining, comparing, sorting, ranking, and analyzing security data, both in its raw form as well as organization and graphical representations of data generated in part by analytics server 110 and in part by software operating at the respective endpoint devices (e.g., 212, 215, 220).

In one particular example implementation, analytics server 110 can include one or more processor devices 250 and one or more machine-readable memory elements 255 for use in executing one or more software programs, including at least a portion of geo-mapping engine 205 and event management engine 210. An example implementation of geo-mapping engine 205 can interface with and utilize data generated or otherwise provided by event management engine 205. In some implementations, event management engine 205 can include multiple components and functionalities such as a policy manager 260, event manager 265, GUI manager 270, and policy editor 275, among other potential components. In some implementations, one or more components of geo-mapping engine 205 and/or event management engine 210 can be distributed and provided on client-based analytics applications, such as analytics applications installed on endpoint devices 212, 215, 220.

A policy manager 260 can collect and provide data and analytics support for security policies relating to operation of one or more security tools in a system. Policy manager can pull, collect, or otherwise access data aggregated at policy management server 115 or directly from one or more corresponding security tools 225. Some of this data can be derived from data objects 295 maintained for the system. System data objects 295 can include data structures defining relationships and attributes within the system such as users, user groups, offices, departments, locations, computing devices, software applications and application categories, system groupings, and other real-world attributes, people, locations, programs, business entities, organizations, devices, and other things relating to the system. Policy manager 260 can manage one or more databases and/or other data structures (e.g., 285) including data identifying policies and rules controlling one or more security tool deployments 225 and describing attributes of the policies and rules. Policy data 285 can include information such a name, address, or other identifier of the policy; geographic locations to which a particular policy applies or how a policy applies differently to different geographic locations; the security tool(s) to which it applies; the type or category of security tool action controlled by the policy; the applications, components, and/or devices controlled, monitored, and/or protected by security tools according to the policy; groupings of devices or users controlled by the policy; an indication of the importance or criticality of the policy; the types of alerts or events triggered by violations of the policy, among other policy attributes.

Event manager 265 can collect and provide data and provide analytics support relating to security events detected in a system (e.g., at security tools 225), including events triggered as violations of a particular policy. Event manager can pull, collect, or otherwise access data aggregated at security event detection server 120 or directly from one or more corresponding security tools 225. Event manager 265 can manage one or more databases and/or other data structures (e.g., 290) including aggregated security event data identifying attributes and characteristics of detected security events. Some of this data can be derived from system objects 295. Such security event data can include an identifier of the event; a device or subsystem involved in the security event (as well as the location, user, or manager of the device); the number of events detected; the time the event was detected; identification of policy violations triggering the event; what actions, programs, or computing resources were in violation the policy; a logical system grouping associated with the security event (e.g., a department, business unit, type of device, etc.); identification of the last time the security event occurred or other history data describing prior security event detections; criticality or severity of the event; whether the event has been remedied or assigned to a ticket, IT professional, etc. for resolution; among other examples.

In addition to managing policy data and security event data respectively, policy manager 260 and event manager 265 can each provide additional functionality tailored to performing particular analytics operations on and providing GUI presentations and graphical representations, in connection with GUI manager 270, based on the corresponding policy data 285 and event data 290. Further, GUI manager 270 can integrate GUI elements, such as windows, panes, graphical representations, controls, and other GUI elements of different contexts, including policy-centric contexts and event-centric contexts. Further, GUI manager 270 can interface with, provide functionality for, or operate cooperatively with geo-mapping engine 205 in connection with the generation of GUIs mapping identified security events and related event attributes (e.g., corresponding policies, attributes defied by system objects 295, etc.) to geographic locations, for instance, on an interactive map GUI. A GUI generated using GUI manager 270 can include multiple different contexts, combining, for instance, a geography-focused context with one or more other contexts, such as a time-based event context, policy-centric context, etc. Generally, a context can correspond to a logical category, subject, or theme through which particular data can be viewed, organized, or represented, for instance in analytics operations, GUIs, or other analytics application features. Indeed, users can interact with one or more GUIs provided for a first context (e.g., a geography-centric context) in connection with performing one or more analytics operations within this first context and then initiate the generation and/or presentation of additional GUI elements presented in a second context (e.g., a policy-centric or time-based, event-centric context, etc.). GUI elements presented in the presented GUIs can further show how interactions in one context relate to another context. A GUI manager 270 can provide this integration in some implementations.

As a simplified example, a user can view a listing, infographic, or other graphical representation of a set of security events (i.e., in the event-centric context). The user can perform filtering, ranking, sorting, searching, joining, calculations, and other analytics operations that result in an identification of a different set of data describing the security events, such as a selected subset of the set of security events or calculation results based on security event data. In some instances, the generation of the event-centric listing can itself be generated in response to a user's interaction with another GUI window, such as geographic mapping of events to a map. Interactions with GUI elements in the map window can cause the listing of events for inclusion in the listing to be filtered, in accordance with the interactions.

In other instances, the policy-centric GUI windows and elements can be presented and include policy-centric information, graphic representations, infographics, etc. describing attributes of each of the identified policies as well as policy-centric analytics operations (e.g., filters, rankings, calculations, organizations, etc. that are specific to the analysis of security policy data). Further, GUI controls provided in particular contexts can be tailored to the particular context. For instance, one set of interactive GUI tools provided in the policy-centric GUI element, such as a button or other control, providing the user with the ability to initiate editing of one or more of the security policies identified in the policy-centric GUI element may not be available in another context. For instance, a policy editor 275 can be provided that enables editing of security policy parameters, for instance, in connection with monitoring, quality control, deployment, and maintenance of one or more security tools. Indeed, a GUI integrating policy-centric and event-centric contexts can provide users with a workflow for identifying, diagnosing, and remedying policy- and event-related issues in a system. Modifications made and initiated from such a GUI, employing functionality provided, for instance, by policy editor 275, can affect and modify the vary operation of security tools 225 deployed in the system.

Turning to FIGS. 3A-3D, simplified block diagrams are shown illustrating certain potential security-related events within a monitored computing system. For instance, in FIG. 3A, a system of computing devices (e.g., 305, 310, 315, 320, 340, 345, 350, 355, etc.) are shown. Some of the computing devices (e.g., 305, 310, 315, 320) can be included in a particular monitored computing system, such as an enterprise system, and further interface and communicate with other devices (e.g., 305, 310, 315, 320, 340, 345, 350, 355, etc.) using an enterprise network 325. Security tools can be provided (not shown) that monitor events and activities within the particular system, including activities at devices 305, 310, 315, 320 as well as enterprise network 325. Security tools, in the course of their monitoring of the particular system, can determine or detect particular security-related events, including events based on particular security policies defined for the particular system.

Computing devices within the particular system (e.g., 305, 310, 315, 320) can have corresponding identifiers used by the system, including IP addresses, MAC addresses, user IDs, serial numbers, tracking numbers, and the like. In some instances, detection of events within the particular system can include associating those devices affected or otherwise involved in the detected event with the event. Further, devices within the system can be associated with particular groupings of devices and sub-systems defined within the monitored system. Such groupings can be created as a function of the system (e.g., grouping of devices by IP address range, or some other automatically or arbitrarily selected attribute), while other groupings can be more logical, such as devices grouped by a defined user group, office, model, device type, etc. Logical groupings can reflect an organization's internal business logic, functional relationships between the grouped devices, or some other second-order logic. Logical groupings can include user-defined groupings and can be independent of machine-specific identifiers, such as the devices' IP or MAC addresses, among other examples. Consequently, computing devices within the particular system (and their particular address information) can be mapped to one or more device groupings, either by IP address range or some other defined attribute.

Figure 3A:
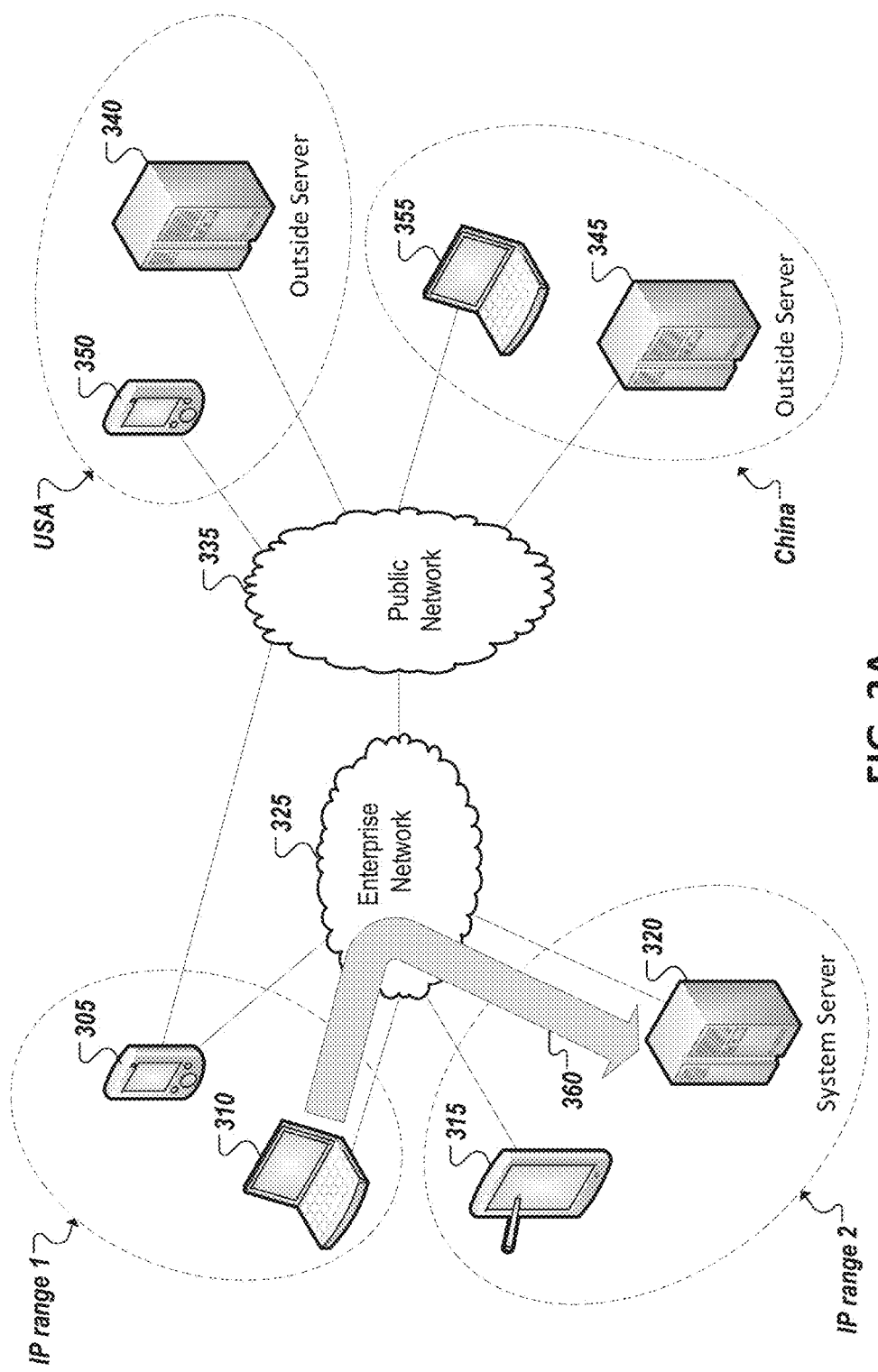
FIGS. 3A-3D are simplified block diagrams illustrating example security events in detected in a system in accordance with at least some embodiments.

In the example of FIG. 3A, devices in the particular system can be grouped according to the IP address range within which each device's respective IP address falls. For instance, devices 305 and 310 can be grouped in a first IP address range (e.g., addresses falling between IP addresses beginning with "10.1" to "10.15"), while a second IP address range is identified (e.g., "10.16" and higher) that includes devices 315, 320.

It should be noted further, as shown in each of FIGS. 3A-3D, that devices outside the system can each be identified to be located in or otherwise associated with a particular geographic location, for instance, through geo-location analysis of each devices' (e.g., 340, 345, 350, 355) respective IP address, or another geo-locational techniques. For example, it can be identified that some outside devices or systems 340, 350 (e.g., devices not included in the monitored system, such as an enterprise system) are located, for instance, in China, while other devices and systems are identified as located in or associated with the United States, or other territories and regions. Further, in some instances, the devices 305, 310, 315, 320 within the monitored system, as well as the monitored network (325) may not be collocated and may be spread out among multiple offices, countries, states and provinces, etc. Accordingly, in some implementations, respective geographic locations of the various devices 305, 310, 315, 320 within the monitored system can also be determined, as well as any other logical or arbitrary groupings of the devices 305, 310, 315, 320 within the monitored system.

Continuing with the example of FIG. 3A, a particular system-security-related event (e.g., 360) can be identified. In some instances, as shown in the example of FIG. 3A, an event can be an intersystem event, in that it involves a source device (e.g., 310) and target device (e.g., 320) both included within the system. As an example, security event 360 can involve a particular end-user source device 310 attempting to gain unauthorized access to or perform unauthorized, risky, or otherwise inappropriate activities on target system server device 320 over enterprise network 325 (e.g., based on one or more policies dictating use of either or both of devices 310 and 320 as well as enterprise network 325). Other intersystem events can also be detected, including intersystem events involving any combination of system devices 305, 310, 315, 320 and/or enterprise network 325.

Figure 3B:
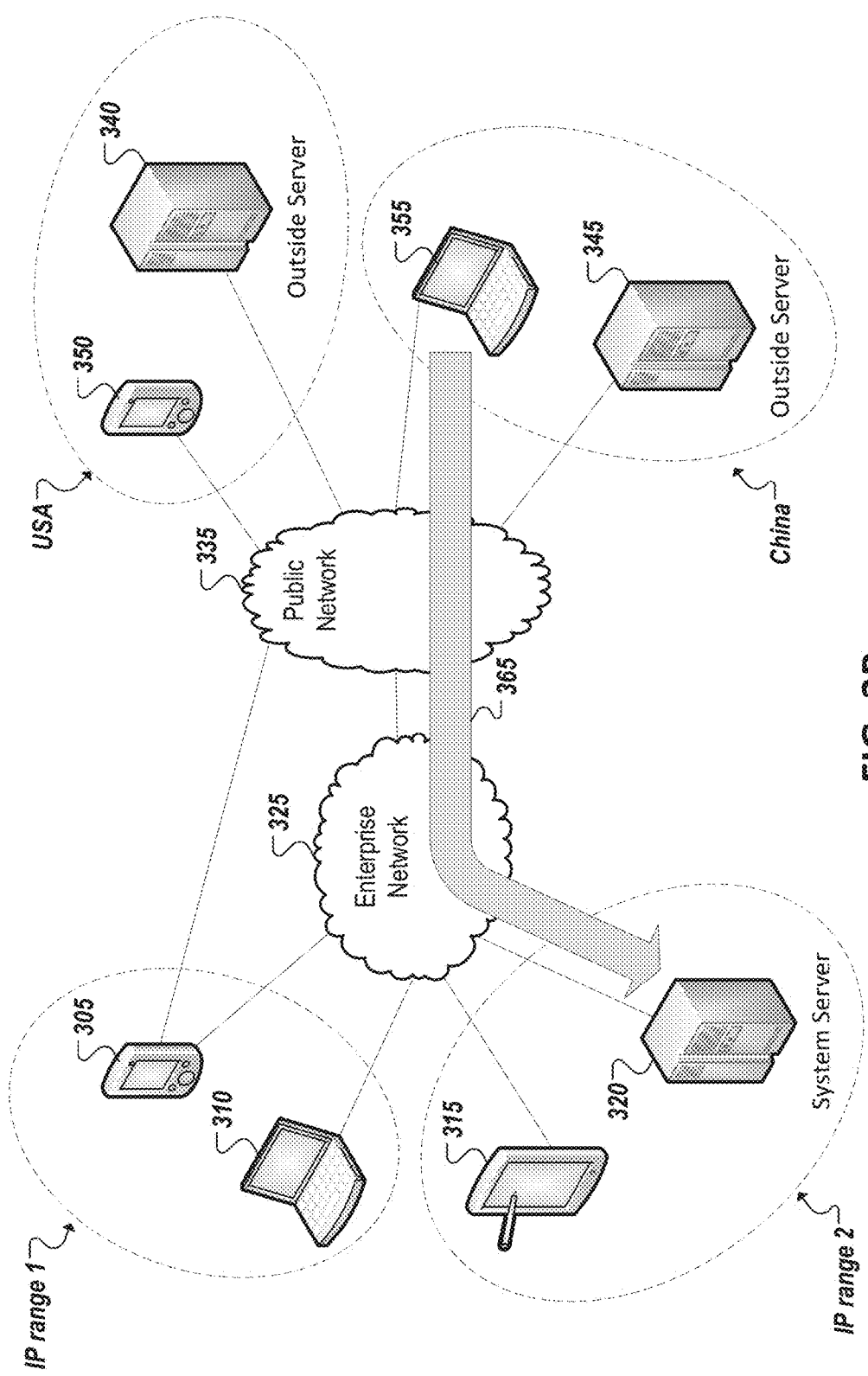

Turning to FIG. 3B, a different security-related event 365 is illustrated involving the monitored system (e.g., including 305, 310, 315, 320, 325). In the particular example of FIG. 3B, one or more devices (e.g., 340, 345, 350, 355) or networks (e.g., public network 335, such as the Internet) can be involved in the identified security event 365. When the event (e.g., 365) involves a device (e.g., system server 320) of the monitored system and at least one device or user outside the monitored system (e.g., end-user device 355), the event can be considered an intrasystem event.

In the particular example of FIG. 3B, an outside device (e.g., 355) may attempt to hack, gain unauthorized access to, install malware on, or perform another action (e.g., 365) targeting, affecting, harming, threatening, or impacting (collectively "targeting") a monitored system server 320 that is deemed to be a security event according to one or more security policies. In this particular example, outside device 355 is the source of the event and monitored system device 320 is the target. In other examples, such as the example of FIG. 3C, an intrasystem security event can also involve detection of an event 370 that involves unauthorized activities by a source device (e.g., 310) within the particular monitored system targeting an outside device (e.g., server 340).

Figure 3C:
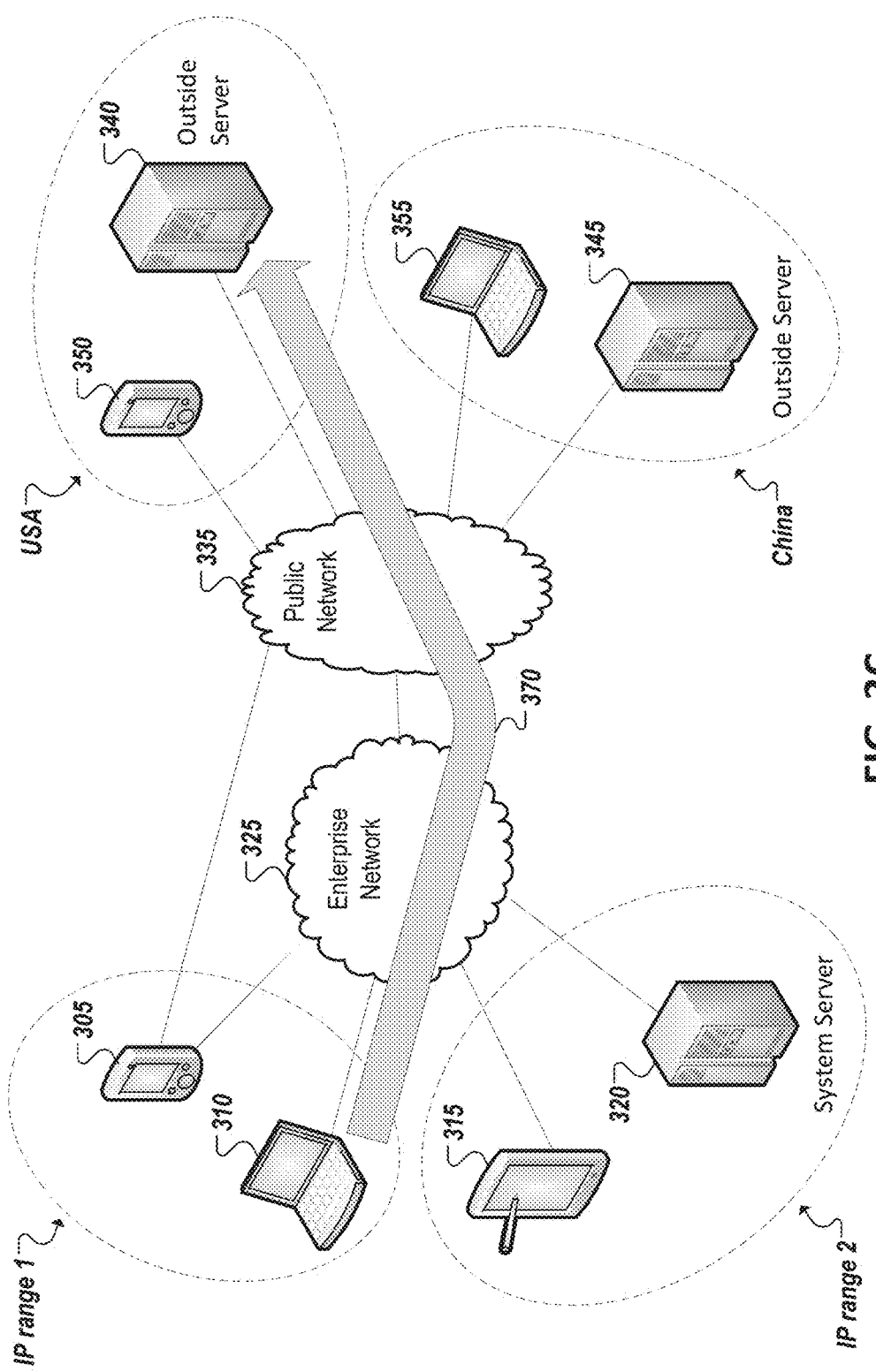

In the examples of FIGS. 3A-3C, security events can be detected involving source and target devices. Further, respective geographic locations of target and source devices outside the monitored system can be determined, as well as a respective system grouping associated with devices included in the monitored system. For example, in connection with the particular example of FIG. 3B, it can be determined that a security event has been detected involving an attack on a system device (e.g., 320) included in "IP address range 2" by another device or system (e.g., 355) identified as being located in China, as an example. Further, in the particular example of FIG. 3C, an event source (e.g., device 310) can be detected to reside within "IP address range 1," the event affecting or targeting an outside device identified as being located in the United States. In some instances, this information can be collected and utilized, for instance, in GUIs generated to present information about the events (e.g., 360, 365, 370), including geo-mapping of the events onto an interactive map GUI.

Figure 3D:
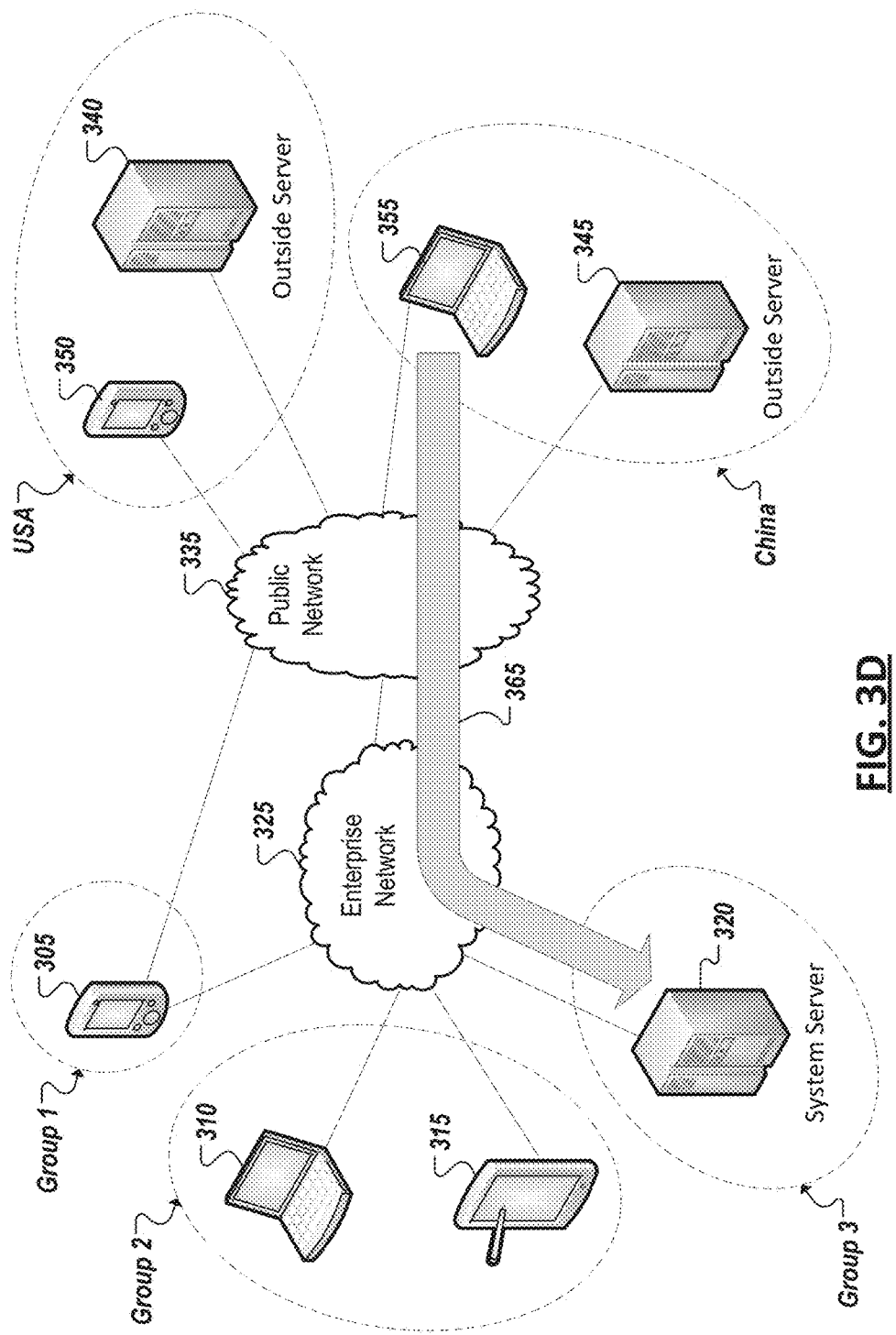

As noted above, devices 305, 310, 315, 320 within a monitored system can be grouped using a variety of techniques in lieu of or in addition to grouping the devices according to the devices' respective identifier, such as by IP address (as in the examples of FIGS. 3A-3C). To illustrate, in one example shown in FIG. 3D, in addition to or in lieu of referencing system devices involved in detected security events by IP address range, system devices can be further categorized or referenced according to one or more alternative groupings (e.g., "Group 1," "Group 2," "Group 3"). For instance, in some implementations, devices can be categorized according to user-defined groupings, such as according to device type, location, operating system, device owner, device manager, etc. As shown in FIG. 3D, a target device 320 of event 365 (of the example of FIG. 3D) can be identified as not only included in a particular IP address range (e.g., IP address range 2) but can also (or instead) be identified as included in one or more alternative groupings (e.g., Group 3).

Figure 4A:
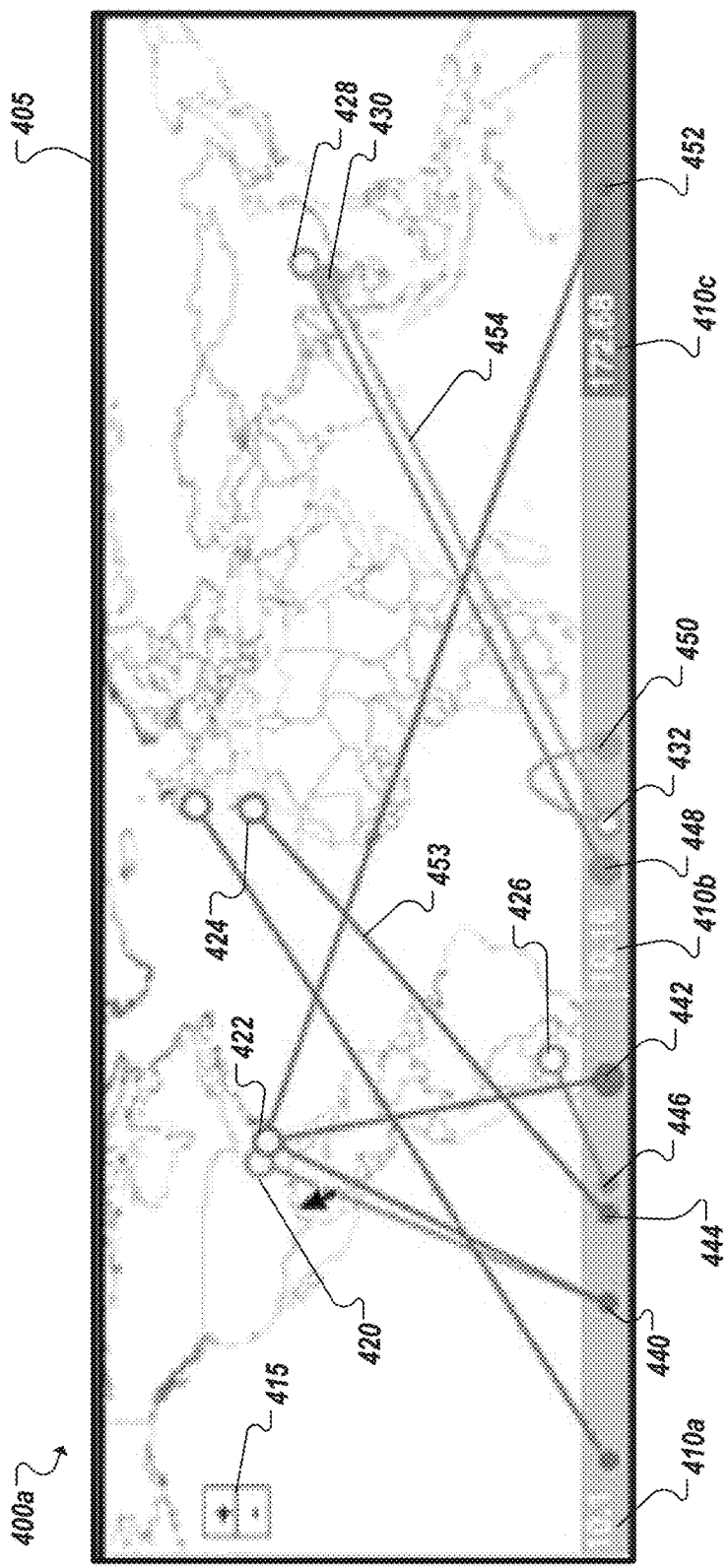
FIGS. 4A-4D are screenshots of example user interfaces illustrating geo-mapping of security events in accordance with at least some embodiments.

Turning to FIGS. 4A-4D, screenshots 400a-d are shown of example user interfaces provided, at least in part, through functionality of a geo-mapping engine in connection, for instance, with functionality of an analytics server and/or one or more security analytics programs. Screenshots 400a-d are provided as examples of possible GUIs providing a view of the geographical context of particular detected events (e.g., the types of events shown and described in the examples of FIGS. 3A-3D), as well as, in some instances, those policies relating to the detected events. Turning to FIG. 4A, a screenshot 400a is shown illustrating an example GUI window 405 presenting an interactive map overlaid with graphical elements (e.g., 410a-c) representing groupings of computing devices within the monitored system as well as additional graphical elements (e.g., 420, 422, 424, 426, 428, 430, 432, 440, 442, 444, 446, 448, 450, 452) representing detected security events involving the monitored system. The graphical representation of interactive map GUI 405 can further include interactive GUI tools, such as tool 415, adapted to allow a user to zoom-in or -out of a particular view of a map displayed in the GUI 405. In some implementations, this control may be offered implicitly, in the case of presenting the feature on a touchscreen device. Other functionality of map GUI 405 can include the ability to search for a particular geographic location and identify a corresponding location on the displayed map, drag a displayed map view to pan to alternative map views, and otherwise view and control the viewing of varying sections (or all of) an available map view presented (or capable of being presented) in map GUI 405.

A plurality of graphical elements (e.g., 420, 422, 424, 426, 428, 430, 432, 440, 442, 444, 446, 448, 450, 452) representing detected security events can present information relating to devices and systems affected or otherwise involved in the respective security event(s). For instance, element 420 can correspond to a location of an identified source of a security event detected as affecting or targeting one or more devices in the monitored system. In the particular example of FIGS. 4A-4D, two different graphical element types are provided, one representing an identified "source" of a security event (e.g., open circle elements, such as elements 420, 422, 424, 426, 428, 432) and a second representing a corresponding "target" of the security event (e.g., filled circle elements, such as elements 440, 442, 444, 446, 448, 450, 452). Further, a source element (e.g., shown with the open circle) for one or more events can be graphically represented as being associated with one or more corresponding targets, by virtue of a connector (e.g., 453, 454) connecting the source element (e.g., 424, 432 respectively) to a corresponding target element (e.g., 444, 430 respectively).

Further, multiple elements (e.g., 420, 422, 424, 426, 428, 430, 432, 440, 442, 444, 446, 448, 450, 452, 453, 454) can be presented in a single map GUI view (e.g., 405) at a single time, for instance, to represent the total or a filtered subset of the total number of security events detected within a monitored system over a particular period of time. The security events presented in the map GUI view 405 can be filtered, for instance, based on the identification of a particular geographic region (e.g., represented by a portion of the map GUI presented in a given view), according to a subset of certain security policies upon which the security events are based, a subset of the type(s) of the security events, by user (e.g., filtering the set of detected events to show events that a particular user administrator is responsible for monitoring and resolving), among other examples.

Figure 4B:
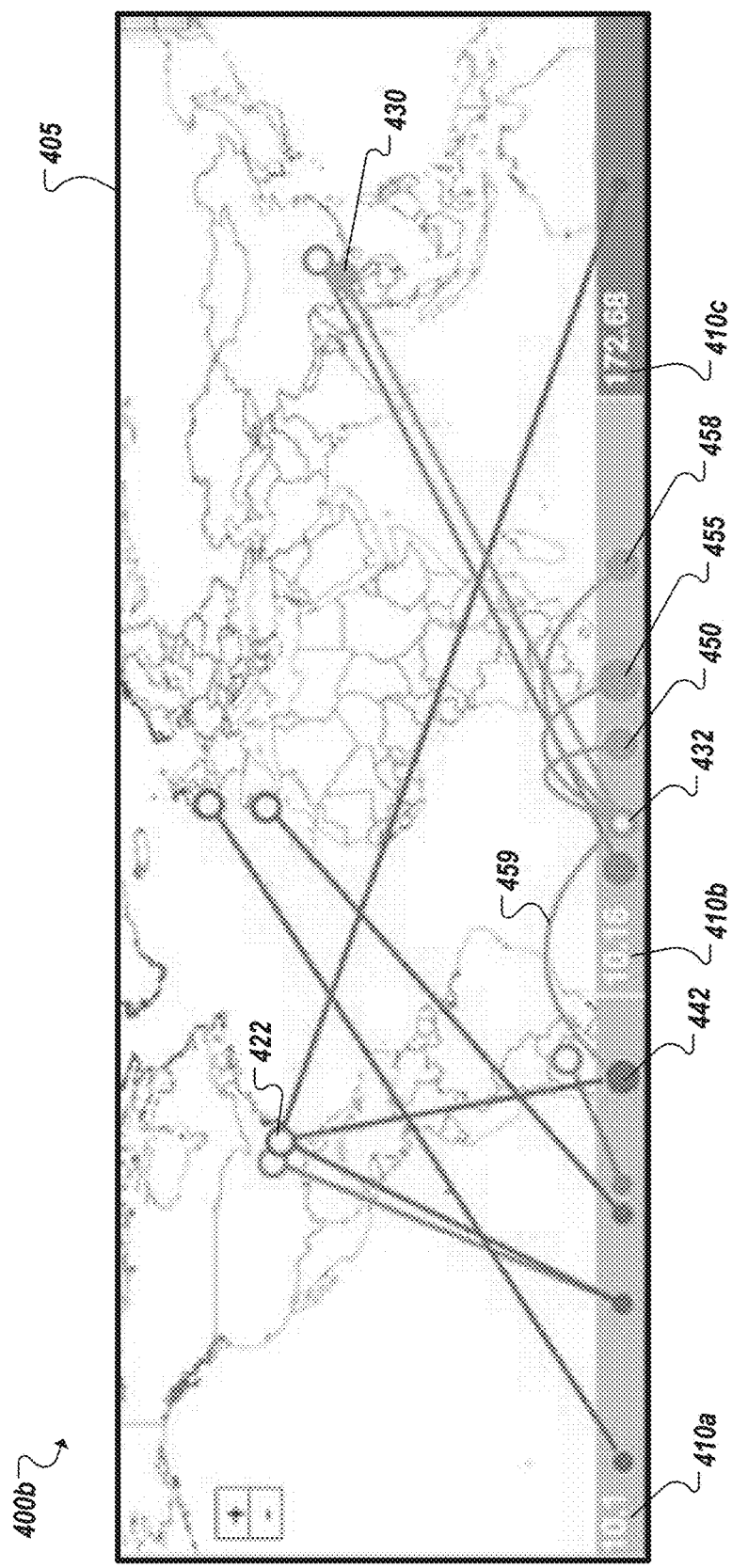

Graphical elements 410a-c representing groupings of computing devices can be rendered on map GUI 405 based on an automated or user selection of one or more particular groupings of computing devices. For instance, a user may opt to perform an analysis of particular non-routable IP address ranges, types of computing devices within a system (e.g., all laptops, all Windows™-based machines, etc.), devices associated with particular users (e.g., owners of the device, registered users of the device, or an administrator tasked with overseeing security of the device, etc.), and other groupings. Corresponding asset groupings (and constituent devices) can be identified (e.g., by IP address, MAC address, or other mapping to the asset grouping) and graphical elements (e.g., 410a-c) rendered and presented overlaid on map GUI view 405. In some instances, the relative size of graphical elements 410a-c can be rendered to reflect the relative size of the grouping (e.g., the number of devices within the grouping), or otherwise optimized for use in the representing asset groupings and events. For instance, the span of graphical elements 410a-c can be optimized based on the number of events detected within a corresponding asset grouping, with a larger span (or graphical element area) being provided to accommodate for the number of event elements (e.g., 432, 440, 442, 444, 446, 448, 450, 452) presented on graphical elements 410a-c. Further, while in the examples of FIGS. 4A, 4B, and 4D show a single row of graphical elements 410a-c, in other instances, multiple rows of graphical elements (e.g., 410a-c) can be provided to represent analyzed asset groupings in connection with map GUI view 405. In some instances, a particular device or cluster of devices can belong to multiple groups represented by asset grouping elements 410a-c and corresponding asset grouping elements (and/or event elements) can be rendered to represent these intersections or overlaps of asset groupings.

While the location of an event graphical element's (e.g., 420, 422, 424, 426, 428, 430) placement on map GUI view 405 can correspond to a particular geographic location of the represented event, placement of event elements (e.g., 432, 440, 442, 444, 446, 448, 450, 452) presented on graphical elements 410a-c can, in some implementations, represent more than a corresponding event's involvement within a particular grouping. For instance, placement of graphical elements 432, 448, 450 within graphical element 410b can represent the relative IP address of devices involved in the represented event (e.g., with element 448 representing a device or device cluster with a lower IP address in IP address range "10.16" than the devices represented by elements 432 and 450), while in other examples, placement of graphical elements 432, 448, 450 within graphical element 410b can represent the relative chronology of detected events (e.g., with the event(s) represented by element 448 beginning (or detected) earlier than events represented by elements 432, 450). Other conventions and techniques can also be employed dictating the placement of event elements on graphical elements 410a-c. For example, event elements (e.g., 432, 440, 442, 444, 446, 448, 450, 452) can be presented in accordance with an event's determined degree of severity. In other instances, event elements (e.g., 432, 440, 442, 444, 446, 448, 450, 452) can be presented on asset grouping elements 410a-c in a manner identified as visually pleasing to most users. Further, in some examples, a user can select the convention to be employed for ordering, sorting, or otherwise presenting asset grouping elements 410a-c, as well as ordering or presenting event elements (e.g., 432, 440, 442, 444, 446, 448, 450, 452) on asset grouping elements 410a-c. For example, a user can select (or toggle selections) to have event elements (e.g., 432, 440, 442, 444, 446, 448, 450, 452) presented on asset grouping elements 410a-c by relative IP address, chronological order, severity, etc. In some implementations, a user can interact with presented event elements (e.g., 432, 440, 442, 444, 446, 448, 450, 452) and drag and drop the event elements at any location within a corresponding asset grouping element 410a-c to order or organize the presented event elements according to the user's preference, among other examples.

To illustrate, in the example of FIG. 4A, an intrasystem security event can be identified as being caused, initiated, or otherwise associated with a source device located in Argentina. A corresponding graphical element 426 overlaid on a portion of the GUI map corresponding to Argentina can represent the source device's location in Argentina and further note that the security event targeted or otherwise affected a target device in a monitored system (e.g., based on the placement of a corresponding graphical element 446 located in grouping element 410a). The target device can be identified as included in a grouping of devices according to IP address range. In this particular example the target device can be included in IP address grouping "10.1" (e.g., for IPv4 IP addresses beginning with "10.1.X.X"). The grouping to which the target device belongs can be represented by target graphical element 446 and the graphical element's 446 placement near or on graphical element 410a representing IP address grouping "10.1". Graphical elements 426 and 446 can further be graphically represented as connected to show that the source device is identified as corresponding to a particular type of security event originating in Argentina (represented by element 426) and targeting one or more devices in a particular IP address grouping "10.1" (represented by element 446).

In some instances, a single graphical element (e.g., 420, 422, 424, 426, 428, 430, 432, 440, 442, 444, 446, 448, 450, 452) can refer to a plurality of security events detected involving a particular source or target, or sources and targets within a particular geographic location or system grouping. For instance, graphical elements 424 and 444, including the graphical connector 453 linking the two elements, can represent multiple instances or detections of a particular security event or type of security event within a particular span of time, each of the event instances or detections involving sources based in Portugal and targets included in an IP address range "10.1" grouping within the monitored system. Each of the events corresponding to the combination of elements 424, 444, 453 can be events that involve the same source device or multiple source devices (e.g., represented individually or collectively by element 424) all detected as being located within Portugal. Similarly, events corresponding to the combination of elements 424, 444, 453 can be events that each affect or target a single device or multiple devices within a particular asset grouping of IP addresses (e.g., "10.1").

In some instances, a single source element can be mapped to multiple target elements. Further, multiple target elements can be mapped to multiple source elements (e.g., representing a multi-source attack, or some other security event involving multiple sources in multiple geographic regions). As an example, a security event is mapped from a source element 422 (representing a source in the East Coast of the United States) to multiple system targets represented by elements 440, 442, 452. Mapping an event to multiple targets, such as in this example, can represent a variety of event attributes, including multiple, distinct devices affected by the event, particular clusters of detected events (such as clusters of events identified within a subset of a particular system grouping (e.g., as with the two elements 440, 442 included in the same grouping "10.1"), or particular clusters of detected events within particular timeframes (e.g., element 440 represented detected events within a first time period, element 442 representing detected events in grouping "10.1" within a second time period), etc.), and/or multiple instances of the same type of event (e.g., two different virus or malware events originating from the East Coast but involving distinct types malware, etc. affecting devices in the same grouping (e.g., as represented by elements 440, 442), among other examples.

As noted above, multiple different sources or targets can be represented by a single graphical element. In some instances, the number of affected devices (or, alternatively, the number of detected instances of a particular security event or security event type) can be represented in features of a source (or target) graphical element. For instance, as shown in the example of FIG. 4A, the diameter of some elements (e.g., 442) are larger than the diameter of other elements (e.g., 444). In some implementations, the diameter of a particular graphical element overlaid in grouping element 410a-c or the map GUI 405 can represent the number of devices (sources or targets) and/or the number of detected instances of a particular security event or security event type. For instance, based on the respective diameters of elements 442 and 444, it can be identified that a higher number of security events affecting assets in grouping "10.1" have been detected originating from the East Coast of the United States that event originating from Portugal.

Additional information can be conveyed by the map GUI 405 and its constituent elements (e.g., 420, 422, 424, 426, 428, 430, 432, 440, 442, 444, 446, 448, 450, 452). For instance, security events can be categorized according to various criteria, such as by the type of the event, event administrator, inter- and intra-system events, among other examples. In one example implementation, security events can be categorized by type (e.g., antivirus events, malicious site events, intrusion detection events, malicious executable events, obfuscated communication events, etc.) and each type of security event can be color-coded (i.e., assigned a particular representative color). Further, source, target, and connector elements collectively representing instances of a security event of a particular type can each be presented in that corresponding color. For instance, events represented by elements 422, 424, 440, 442, 444, 452, etc. (and their respective connectors) can be events of a first type and presented within map GUI 405 as burnt orange. Further, events represented by elements 430, 432, 450 can be of a second type and presented in a gold color, while events of a third type (represented by elements 426, 428, 446, 448) are presented in blue, among other examples. By using various forms of elements (e.g., source and target elements), adjusting the size of the respective element (e.g., based on a number of detected event instances), and varying the respective color of the elements (e.g., based on event type) a number of informative characteristics of a diverse (and potentially overwhelming) set of detected security events can be conveniently communicated to a user, for instance, to assist the user in effectively and efficiently managing security within the system or a subsystem thereof.

As noted above, in some implementations, the map GUI 405 can be interactive, allowing a user to zoom-in or -out, pan and scroll, and otherwise control the view of a map presented in the map GUI 405. Further, graphical elements (e.g., 420, 422, 424, 426, 428, 430, 432, 440, 442, 444, 446, 448, 450, 452) included in and/or overlaid on the map GUI 405 can also be interactive. For instance, selection of or mousing-over a particular source element (e.g., 428) by a user can prompt the rendering or presentation a view, such as a pop-up window or other window or GUI element, communicating additional details concerning the source element such as the type or nature of the corresponding event, the number of detected events, the date of the last detected event, a more precise location of the event (e.g., the city or state of the event), an administrator assigned to the event, a user associated with devices affected by the event, among other details. Similar details can be provided relating to a particular target or group of targets in response to a user's interaction with a corresponding target graphical element (e.g., 448). Connector elements can also be interacted with to provide detailed views describing attributes of the related event instance(s). Further, in some instances, selection of or interaction with a particular event-related element (e.g., 424, 444, 453) can cause a set of security events considered in a GUI window or event analysis to be filtered. For instance, selection of a particular interactive graphical element can prompt the filtering of the set of events according to the type of event, a geographic location associated with the event, system groupings associated with the event (e.g., "10.1," "10.16," etc.), among other examples.

Interaction with grouping elements (e.g., 410*a*-*c*) can also cause a set of events to be filtered. For example, selection of grouping element 410*c* can filter the set of results to only show, consider, or provide additional details for events involving a grouping of computing assets within a range of addresses beginning with "172.68." Further, in some implementations, interactions with graphical elements of map GUI 405 that prompt a corresponding filtering of a set of considered security events can further result in the presentation of map GUI 405 being altered. For example, selection of a graphical element corresponding to a particular country can cause only events to be displayed that involve that country. Selection of a graphical element corresponding to a particular type of event can cause only events to be displayed in map GUI 405 that are of the selected type. In another example, selection of a particular grouping element (e.g., 410*a*-*c*) can cause non-selected groupings (and corresponding graphical elements) to be replaced, for instance, by sub-groups within the selected grouping (e.g., selecting grouping "172.68" can result in grouping elements 410*a*-*c* being replaced by new grouping elements corresponding to sub-groupings of the "172.68" IP address range (e.g., groupings "172.68.1," "172.68.8, " etc.)), among other examples.

Further, in some instances, a user may desire to only view security events corresponding to a particular subset of the system. As in the example of FIG. 4A, IP ranges "10.1," "10.16," and "172.68" may only represent a small subset of the assets (and corresponding assigned IP addresses) within the monitored system. In some instances, a user can pre-select a subset of a plurality of asset groupings within the system, the plurality of asset grouping representing the totality of assets in the system. For instance, in the example of FIG. 4A, map GUI 405 can be generated based, for instance, on a user's prior selection of asset groupings "10.1," "10.16," and "172.68." Similarly, other criteria can be used to generate or refine the presentation of a particular map GUI, including the set of event types, geographic locations, and other event features selected by a user (include selection made from interactions with the map GUI 405 itself).

In addition to changing in response to user interactions with the map GUI 405 and its constituent graphical elements, map GUI 405 can also change dynamically and automatically as additional security events are detected and security event data collected. For example, in FIG. 4B, additional event instances can be detected and presented in map GUI 405, represented by graphical elements 455, 458, 459. FIG. 4B further illustrates examples of intersystem events, such as events involving one or more sources (represented by element 432) threatening or performing particular activities involving target devices represented by elements 450, 455, 458) also located with the system. Further, in some instances, a particular event can both by an intersystem and an intrasystem event, involving targets included both inside (e.g., at 450) and outside (e.g., at 430) the monitored system, and/or involving sources included both inside (e.g., at 432) and outside (e.g., at 422) the monitored system.

Figure 4C:
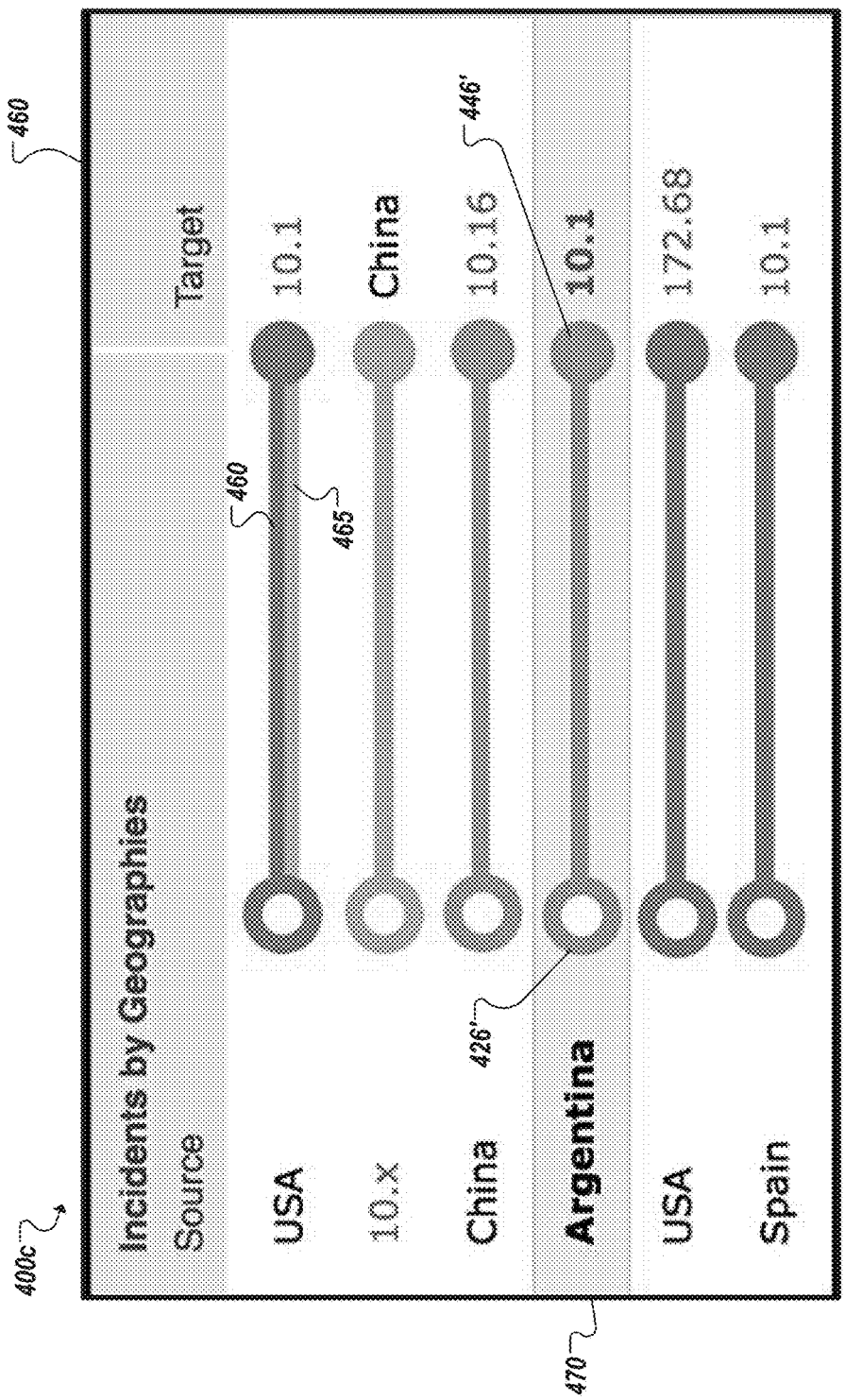
Figure 4D:
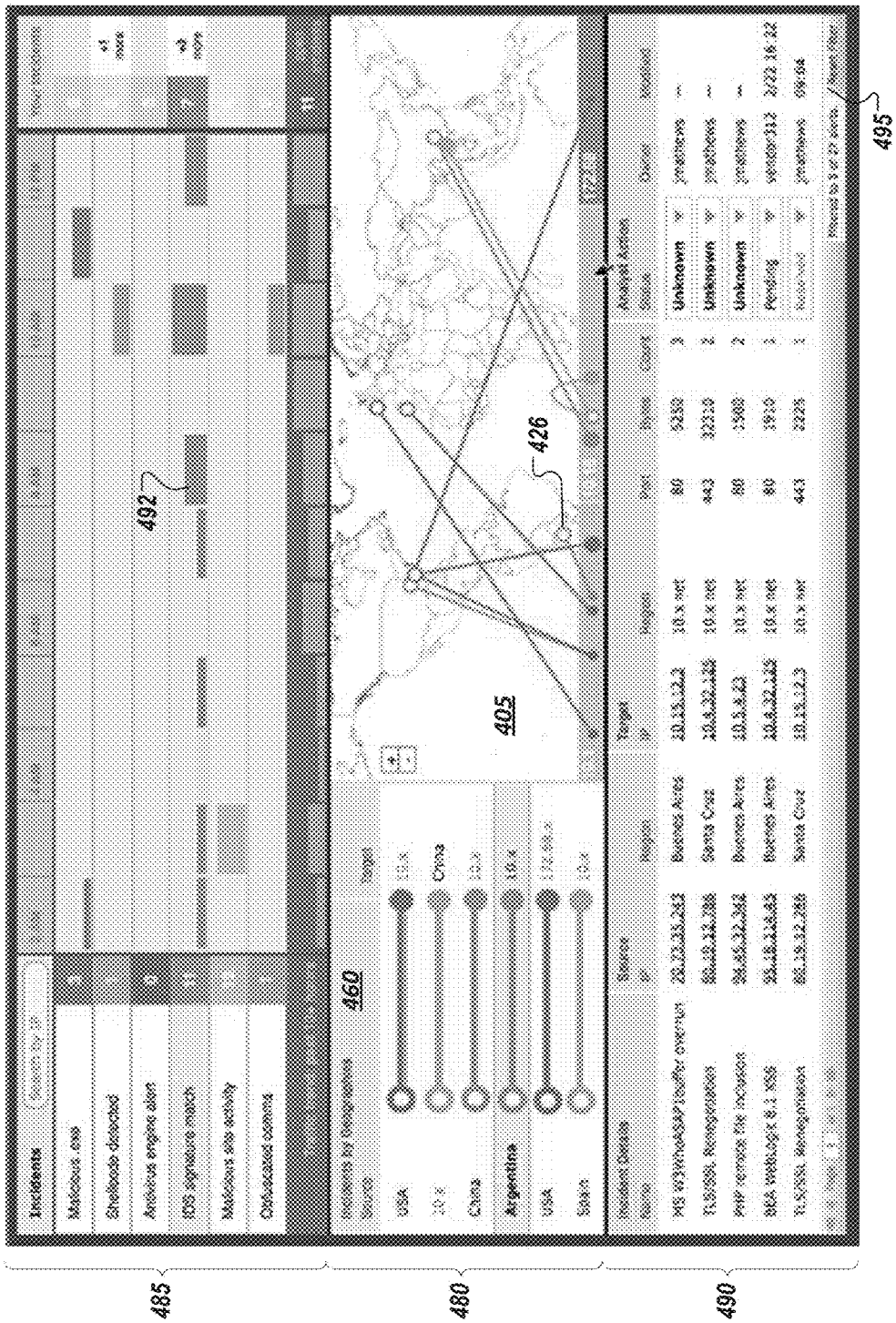

Turning to FIG. 4C, additional GUI windows (e.g., 460) can be generated reflecting or summarizing geographic relationships of detected security events. Further, such geo-locational GUIs can be presented in connection with or based upon map-based geo-location GUIs, such as map GUI 405 of FIGS. 4A-4B. Indeed, in one example, a geo-locational summary GUI 460 can be presented in connection with a map GUI (e.g., 405) to summarize and provide an alternative view of a geography-based event GUI context.

In the example of FIG. 4C, a screenshot 400*c* is shown of a geo-locational summary GUI 460 including a summary of security events, their respective sources and targets, as well as geographic location and system groupings identified for the identified sources and targets. The alternate view of a geo-locational summary GUI 460 can provide for aggregated view, for instance, of the types of security events affecting particular system groupings and involving particular geographic locations. Indeed, in the particular example of FIG. 4C, a portion of the events mapped in the screenshot 400*a* of map GUI 405 in FIG. 4A are presented within geo-locational summary GUI 460. For instance, a source element 426' (mapping source element 426 of map GUI 405 located in Argentina) is shown in geo-locational summary GUI 460 and associated with "Argentina." The target element 446' likewise corresponds to the target element 446 of GUI 405, representing devices and assets in a monitored system affected by the security event and included in system grouping "10.1." Further, the representation in summary GUI 460 can make explicit the implicit representation in other graphical renderings (e.g., map GUI 405) regarding the distinction between source and target (or destination) of an event, while preserving the conventions used in other presentations (e.g., an empty circle element representing the source and a filled circle element representing the event target). Further, the security event (represented by elements 426', 446') can be color-coded consistent with the color-coding employed in the corresponding map GUI 405, for instance, representing a specific type of the event, or the most critical type amongst a plurality of related events, or some other easily approachable and predictable representation. Similarly, other events represented in map GUI 405 can be mapped to geo-locational summary GUI 460, as shown in the example of FIG. 4C.

As with the GUIs of FIGS. 4A and 4B, in some implementations of geo-locational summary GUI 460, constituent graphical elements (e.g., 426', 446', 470) can be selectable or otherwise user-interactive and prompt certain filtering, GUI controls, and selection tasks associated with security event management. For instance, a row element 470 corresponding to the Argentina-based event (represented by elements 426, 446 in GUI 405) can be selected, for instance, to display a window presenting additional details and attributes of events represented by graphical elements (e.g., 426', 446', 470), among other examples, including the sorting, filtering, and selection of security events to be presented in the geo-locational summary GUI 460 and/or map GUI 405.

As noted above, geo-location of security events and related GUIs can be but one of several available contexts for presenting and assessing security events detected within a monitored system. As shown in the example of FIG. 4D, multiple GUI contexts can be displayed within a single GUI, including geo-locational GUIs 480 (e.g., including map GUI 405 and geo-locational summary GUI 460), event-centric trendline GUI presentations 485 (e.g., showing the quantity of different types of security event detected within particular, progressive time periods), detail view GUIs 490 (e.g., presenting details of particular security events, categories of security events, related security policies, etc., based, for instance, on user interactions with corresponding graphical representations of such events or policies within other GUI windows (e.g., 480, 485)), among other potential GUI contexts, including policy-centric GUI windows and others.

As noted above, user interactions with one GUI window can effect changes to other co-presented GUI windows. For example, a user selection or other interaction with a GUI element (e.g., 492) in trendline GUI 485 can change or accentuate the presentation of another co-presented GUI, including the presentation of map GUI 405 and its constituent elements. For instance, selection of GUI element 492 representing events detected between 8 am and 9 am in an "IDS signature match" category can prompt the highlighting of a row element in geo-locational summary GUI 460 (e.g., labeled Argentina) to show that events represented in the geo-locational summary GUI 460 row are included in or otherwise related to the security events represented by GUI element 492. For instance, coupling a geo-locational GUI (405) with a trendline GUI 485, however simplified, can reinforce an overriding context of the timeframe in which the analysis is taking place, among other benefits. Similarly, interactions with geo-locational summary GUI 460 or map GUI 405 can prompt other GUI windows and GUIs, including co-presented GUI windows, to be modified in accordance with the user's interaction with the map GUI 405 or geo-locational summary GUI 460. For instance, selection of the row element in geo-locational summary GUI 460 labeled "Argentina," or selection of an element (e.g., 426) presented in map GUI 405 representing an intrusion detection (i.e., "IDS") security event involving Argentina can further prompt the highlighting of a row or elements (e.g., 492) within trendline GUI 485 (or in the other of the geo-locational summary GUI 460 or map GUI 405), among other examples. Further, details of a corresponding security event or subset of security events can be presented (e.g., in GUI window 490) based on the selection of a particular GUI element representing the security event(s). With these various GUI contexts, users can control and assess the relationships between various presented contexts, by interacting with one context and observing the effects of the interaction on the other displayed contexts. Further, a user can control (e.g., filter, sort, etc.) GUI contexts and GUI window displays (e.g., 405, 460, 485, 490, etc.) based on interactions with another of the GUI windows.

Other tools (e.g., 495) can be presented for use in changing and controlling presentations with screenshot 400d. For example, a filter control 495 can be provided to manually filter and designate particular security event subsets, policies, geographic locations, and other criteria controlling what subset of detected security events are presented within GUIs 405, 460, 485, 490, etc. For instance, a user can designate a set of asset grouping, geographies, security event types, managing administrator users, and other attributes involved in a set of security events the user desires to assess using GUIs 405, 460, 485, 490, etc. Further, a user, in some examples, can select the types of GUIs to be presented and used in the assessment of security events as well as the layout of the GUIs where two or more GUIs are co-presented. Still further, tools can be provided for use in addressing particular security events represented in GUIs 405, 460, 485, 490, etc., including tools adapted to create service tickets, system alerts, etc., contact associated system administrators, edit policies and rules upon which particular security events are based, among other examples.

FIGS. 5A and 5B are simplified flowcharts 500a-b illustrating example techniques for graphically representing geo-locational attributes of a set of detected security events within a GUI. For instance, in the example of FIG. 5A, a plurality of security events detected within a particular computing system can be identified 505. Among the plurality of security events a particular security event can be identified. A first device targeted by the security event (e.g., threatened, harmed, targeted, etc.) by the security event can be identified (e.g., 510) together with a particular grouping of system assets including the first device. Further, another device can also be identified 515 as at least partially responsible for and affiliated with the initiation or source of the particular security event. The other identified device can be considered a source device of the particular security event. Further, a geographic location can be identified and associated 520 with the particular security event, based, for instance, on a geo-locational analysis of data or identifiers corresponding to the source device, such as the source device's IP address. A graphical representation of the particular security event can be generated 525 including representations of the source associated with the identified geographic location and the target associated with the identified asset grouping.

Further, in the example of FIG. 5B, a source of a security event within a plurality of identified (e.g., at 505) security events can be detected as being within the monitored system and targeting others device within or outside the monitored system. For instance, a particular grouping of assets can be identified 530 that includes the source device of a particular security event. One or more targets of the security event can also be identified 535. Some identified targets may be determined to be outside of the monitored system. A geographic location can be associated 540 with outside targets, while one of the groupings of assets can be identified for targets determined to be within the system (as in the example of FIG. 5A). Further, a graphical representation of the particular security event can be generated 545 including representations of the source associated with the identified grouping of assets and the target associated with the identified geographic location.

In some instances of either the example of FIGS. 5A and/or 5B, a GUI can be generated and caused to be presented on an end user device. For instance, data can be generated that is adapted for processing by an end user device to render the graphical representation on the end user device. Further, the generated GUI can present a plurality of graphical representations of detected security events. Further, generated graphical representations of detected security events can include graphical representations of the number of detected events, the type of event, the severity of the event, among other information. Other features can be included and adopted in GUIs and graphical security event representations, such as features illustrated and described above, for instance, in connection with FIGS. 4A-4D. Further, it should be appreciated that, for some security events, a geographic location can be identified for the target of the security event and a grouping of assets can be identified for the source of the security event. Additionally, identification of a grouping of assets to which a source or target device belongs can be triggered by identifying that the source or target device is a device within the monitored system. Further, identification of a geographic location corresponding to the source or target device can be triggered by identifying that source or target device is a device outside the monitored system (e.g., a third party device, device outside a monitored network, device remote from devices and subsystems of the monitored system, etc.).

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

One or more data structures can be utilized by software applications and programs described herein, including databases and data objects. Data objects are data entities including one or more defined or inherited attributes and values that can be operated upon by software functions, operations, applications, modules, and other software entities, such as software application and services. In some instances, attributes can be implemented as object metadata. Further, each object attribute can have associated data defining the values of the corresponding object attribute.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANS), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   identifying a particular security event detected in a particular computing system, the particular security event detected as targeting a particular computing device included in the particular computing system;
   identifying a particular grouping of assets in a plurality of asset groupings defined for devices within the particular computing system as including the particular computing device;
   identifying a source of the particular security event, wherein the source is associated with at least one second computing device;
   associating the source with at least one of a geographic location and a grouping of assets included in the plurality of asset groupings; and
   generating data adapted to cause a graphical representation of the particular security event to be presented on a display device, the graphical representation including:
      a geographical map background element representing geographic locations;
      a plurality of graphical background elements representing each of the plurality of asset groupings, wherein each of the plurality of graphical background elements are to be presented outside the geographical map in the graphical representation;
      a first graphical element representing the particular computing device, wherein the first graphical element is overlaid on a particular one of the graphical background elements to represent the particular computing device as included in the particular grouping of assets, and
      a second graphical element representing the source, wherein the second graphical element is overlaid on one of the geographical map background element or one of the plurality of graphical elements to respectively represent the source as associated with the geographic location or one of the groupings of assets included in the plurality of asset groupings.

2. The storage medium of claim 1, wherein the source is associated with a particular geographic location included in the view of the geographic map and the particular geographic location is identified from a device identifier associated with the source.

3. The storage medium of claim 1, wherein the graphical representation further includes a representation of two or more asset groupings in the plurality of asset groupings, the two or more asset groupings including the particular grouping.

4. The storage medium of claim 2, wherein the second graphical element is positioned in the geographical map background element to correspond with the particular geographic location.

5. The storage medium of claim 1, wherein the graphical representation further including a graphical connector associating the first graphical element with the second graphical element and representing that the particular computing device and the source are associated with the particular security event.

6. The storage medium of claim 1, wherein the first graphical element is a bubble element and a diameter of the bubble element corresponds to a quantity of detected security events including the particular security event.

7. The storage medium of claim 1, wherein the source is identified as included in the particular computing system and the source is associated with a first grouping in the plurality of asset groupings.

8. The storage medium of claim 7, wherein the particular grouping is the first grouping.

9. The storage medium of claim 7, wherein the particular grouping is a grouping other than the first grouping.

10. The storage medium of claim 1, wherein the graphical representation further includes representations of each of the plurality of security events.

11. The storage medium of claim 1, wherein each of the plurality of asset groupings is a distinct, user-defined asset grouping.

12. The storage medium of claim 1, wherein each of the plurality of asset groupings corresponds to a range of IP addresses of assets in the particular computing system.

13. The storage medium of claim 1, wherein the graphical representation is an interactive presentation and user interactions with one or more of the first and second graphical elements causes a view to be presented of details of the particular security event.

14. The storage medium of claim 13, wherein the user interactions include a mouse-over of one or more of the first and second graphical elements.

27

15. The storage medium of claim 13, wherein the user interactions include a selection of one or more of the first and second graphical elements.

16. The storage medium of claim 1, wherein the graphical representation of the particular security event communicates a type of the particular security event.

17. The storage medium of claim 16, wherein the graphical representation of the particular security event color-codes each of the first and second graphical elements according to the type of the particular security event, wherein the type of the particular security event is one of a plurality of security event types and each of the plurality of security event types is coded to a respective color.

18. The storage medium of claim 1, wherein the first graphic element is a first type of graphic element representing targets of a security event and the second graphic element is a second, different type of security event representing sources of a security event.

19. A method comprising:
- identifying a particular security event detected in a particular computing system, the particular security event detected as targeting a particular computing device included in the particular computing system;
- identifying a particular grouping of assets in a plurality of asset groupings defined for devices within the particular computing system as including the particular computing device;
- identifying a source of the particular security event, wherein the source is associated with at least one second computing device;
- associating the source with at least one of a geographic location and a grouping of assets included in the plurality of asset groupings; and
- generating data adapted to cause a graphical representation of the particular security event to be presented on a display device, the graphical representation including:
  - a geographical map background element representing geographic locations;
  - a plurality of graphical background elements representing each of the plurality of asset groupings, wherein each of the plurality of graphical background elements are to be presented outside the geographical map in the graphical representation;
  - a first graphical element representing the particular computing device, wherein the first graphical element is overlaid on a particular one of the graphical background elements to represent the particular computing device as included in the particular grouping of assets, and
  - a second graphical element representing the source, wherein the second graphical element is overlaid on one of the geographical map background element or one of the plurality of graphical elements to respectively represent the source as associated with the geographic location or one of the groupings of assets included in the plurality of asset groupings.

20. A system comprising:
- at least one processor device;
- at least one memory element; and
- a geo-mapping engine, adapted when executed by the at least one processor device to:
  - identify a particular security event detected in a particular computing system, the particular security event detected as targeting a particular computing device included in the particular computing system;
  - identify a particular grouping of assets in a plurality of asset groupings defined for devices within the particular computing system as including the particular computing device;
  - identify a source of the particular security event, wherein the source is associated with at least one second computing device;
  - associate the source with at least one of a geographic location and a grouping of assets included in the plurality of asset groupings; and
  - generate data adapted to cause a graphical representation of the particular security event to be presented on a display device, the graphical representation including:
    - a geographical map background element representing geographic locations;
    - a plurality of graphical background elements representing each of the plurality of asset groupings, wherein each of the plurality of graphical background elements are to be presented outside the geographical map in the graphical representation;
    - a first graphical element representing the particular computing device, wherein the first graphical element is overlaid on a particular one of the graphical background elements to represent the particular computing device as included in the particular grouping of assets, and
    - a second graphical element representing the source, wherein the second graphical element is overlaid on one of the geographical map background element or one of the plurality of graphical elements to respectively represent the source as associated with the geographic location or one of the groupings of assets included in the plurality of asset groupings.

* * * * *